United States Patent [19]
Ender

[11] 3,911,117
[45] Oct. 7, 1975

[54] RAW FISH AND IRON CHELATED WITH GLUTAMIC OR RIBONUCLEIC ACID IN A MINK DIET

[76] Inventor: Fredrik Ender, Stasjonsvn 5, 1310 Blommenholm, Norway

[22] Filed: Sept. 26, 1974

[21] Appl. No.: 509,529

Related U.S. Application Data

[63] Continuation-in-part of Ser. No. 314,317, Dec. 12, 1972, abandoned.

[30] Foreign Application Priority Data
Dec. 20, 1971   Norway................................. 4717/71

[52] U.S. Cl. ..................... 424/180; 426/2; 426/212; 426/218; 426/271; 426/376; 426/805
[51] Int. Cl.² ...................... A23K 1/10; A23K 1/18
[58] Field of Search ......... 426/2, 74, 212, 218, 224, 426/271, 806, 805, 268, 376; 424/295, 180; 423/150; 260/429 J, 121, 115, 211.5 R

[56] References Cited
UNITED STATES PATENTS

| | | | |
|---|---|---|---|
| 2,960,406 | 11/1960 | Cardon | 426/2 |
| 3,002,985 | 10/1961 | Imado | 426/295 |
| 3,014,026 | 12/1961 | Kroll et al. | 424/180 |
| 3,168,541 | 2/1965 | Hobbs | 260/439 |
| 3,598,605 | 8/1971 | Van Limborgh | 99/2 |

FOREIGN PATENTS OR APPLICATIONS

| | | | |
|---|---|---|---|
| 146,907 | 6/1952 | Australia | 424/295 |

*Primary Examiner*—Norman Yudkoff
*Assistant Examiner*—Curtis P. Ribando
*Attorney, Agent, or Firm*—Ladas, Parry, Von Gehr, Goldsmith & Deschamps

[57]   ABSTRACT

Diet for fur-bearing animals, particularly mink and a method for feeding the above mentioned animals to prevent iron-deficiency anemia provoked by feeding the animals with raw marine fish and to achieve a better fur quality and reduce kit mortality.

4 Claims, No Drawings

RAW FISH AND IRON CHELATED WITH GLUTAMIC OR RIBONUCLEIC ACID IN A MINK DIET

This application is a continuation-in-part of application Ser. No. 314,317 filed Dec. 12, 1972, and now abandoned.

It has previously been proven, and is now generally known, that feeding mink with cleaned, raw marine fish of various types as single source of protein results in a hypochromic iron-deficiency anemia which again results in high kit mortality, fur depigmentation (i.e. white under-fur) and greatly reduced quality of fur at the normal time of skinning. It has further been proved that a diet including boiled marine fish, on the other hand, does not provoke anemia or, occasionally, only a slight degree of anemia, which may also be due to the fact that an extreme iron deficiency occurs in fish at certain times and also depends on the location of the catch. Anemia of this type is never induced with a diet of meat and offal, however, it may be mentioned that rancid fat together with a deficiency of E vitamin can cause iron deficiency anemia in mink.

It has further proved that iron-deficiency anemia induced by fish is not relieved by peroral use of inorganic iron preparations such as $FeSO_4$ or $Fe(OH)_3$ when these are added to raw fish feed, and this type of anemia differs from the usual elimentary iron-deficiency anemia or anemia caused in other manner which, in human beings and domestic animals, is most frequently prevented and cured by using inorganic iron preparations.

Numerous experiments carried out by the inventor and others have shown that the special type of anemia in mink is due to the content in the raw fish food of trimethylaminoxide (hereinafter called triox).

The anemogenic property of trimethylaminoxide or the anemi-provoking effect in raw marine fish is due to the fact that, with bivalent iron compounds, substantially insoluble, crystalline iron oxide hydrates of the type Goethite and Lepidocrocite (established by X-ray diffraction analysis) are formed under physiologically normal pH conditions. The pH of raw marine fish is usally about 6,3 – 6,5. Because of the insolubility of the iron oxide hydrate, even in relatively strong mineral acid concentrations (HCl and $H_2SO_4$), the nutritions iron content under physiologically normal pH conditions cannot be fully utilized for hemoglobin production in mink kits, and the result is that the animals have a high degree of iron-deficiency anemia which causes a high mortality rate of kits and also leads to strongly reduced quality of fur in the remaining animals. The anemia provoking effect of the raw fish diet is undoubtedly also due to the fact that iron preparations such as $FeSO_4$ and $FeCl_3$, added to raw fish food, are chemically bound to raw fish to a much greater degree than to cooked, which has also been proved by chemical analysis.

The object of the invention is to provide a diet for fur-bearing animals, particularly mink and especially mink fed with raw marine fish, which ensures a supply of organic ferri iron, and a method of feeding such animals, so that the anemia is relieved and kit mortality is reduced, the fur being at the same time of extremely good quality at the time of skinning.

Surprisingly, it has now proved that organic iron compounds especially in ferric form such as an organic iron complex formed from amino acids and/or their derivates, nucleic acids and/or their derivatives together with special organic acids, prevent this type of anemia when added to the raw fish diet.

When added to the raw fish diet, the substances eliminate the unfortunate oxidative effect of the trimethylaminoxide, the oxidation being inhibited or reduced so strongly in vivo that insoluble iron compounds are not formed in injurious amounts and with the result that the anemia neither occurs nor is provoked.

The invention thus relates to an improved diet for fur-bearing animals, particularly mink, comprising raw marine fish and an iron containing additive, wherein the improvement comprises an organic chelate additive containing ferric iron chelated with an organic acid selected from glutamic acid and ribonucleic acid.

The invention further relates to a method of feeding fur-bearing animals, particularly mink and especially mink fed with raw marine fish to ensure a supply of ferri iron by using an iron chelate or an organic iron compound as organic iron complex, the method being characterized in that the iron chelate or the organic iron complex does not react, or reacts only to a very slight degree with trimethylaminoxide, in that it consists of iron and an amino acid or nucleic acid and that it is dosed in an amount corresponding to at least 1 mg Fe per animal per day.

The iron chelate or the organic iron complex is preferably present in the form of an aqueous solution, in dried state, or adsorbed on a carrier.

The chelate- or complex-forming compound is preferably an amino acid, particularly glutamic acid and/or asparaginic acid, and/or histidine. Further, the chelate- or complex-forming compound can be a nucleic acid, preferably ribonucleic acid and/or desoxyribonucleic acid.

The diet according to the invention is preferably utilized as protective food for fur-bearing animals, particularly mink, together with vitamins and minerals.

The organic iron preparations can thus be incorporated in a protective food, for example, as additive to special carbon hydrates which are included in the protective food, optionally in another manner also. Experiments have shown that this method is fully effective. Since the raw fish food in itself is extremely deficient in iron, it is most expedient that biologically strongly active iron preparations preferably ferri compounds in tested doses are incorporated directly into the diet of the fur-bearing animals (the protective food) which is dried carefully at low temperatures.

The concentration of the organic complex iron compounds is thus measured so that it represents a daily ration of minimum 1 mg Fe. In order to achieve the best effect, the pH value of the food should be fairly low.

The anemia-preventing effect exerted by the above said group of substances, used as diet additive according to the invention, is based on the fact that separately or in combination, strongly or partially, they inhibit, in vivo, the reaction between bivalent iron and trimethylaminoxide, so that sparingly soluble iron oxide hydrates of the type Goethite and Lepidocrocite are not formed, or possibly only traces thereof.

Characteristic of all the above said anemia-preventing iron-containing organic substances, used as diet additive in accordance with the invention, is that they are not, or only to very slight degree, destroyed by, nor do they react with triox, which is an anemiaproducing agent. The anti-anemic effect of boiled fish food is assumed to be the result of denatured protein compounds such as polypeptides, preferably the lower molecular peptides such as di- and tripeptides, possibly free amino acids, which are to be found both in cooked and in raw protein food. To protect the animals against anemia by daily boiling of fish for a long period diet, with the addition of usual inorganic iron compounds (FeSO$_4$), is elaborate and time consuming and is also expensive for the breeder of fur-bearing animals.

As the organic iron preparations usually give improved protection at lower pH values — down to 2,5, this can be adjusted by the addition of HCl or organic acids which, in themselves, have an anti-anemic effect, for example, lactic acid, malic acid and/or citric acid. Malic acid and lactic acid have in, in vitro, experiments a clear triox prohibiting effect, and citric acid has in, in vitro, experiments given the same effect despite the fact that substances such as ferri-citrate are only our, underfur and fur quality, total impression at the time of skinning, are set forth.

Normal hemoglobin values on skinning are about 17,5 – 19, these being much lower during the summer.

Evaluation numbers for the colour of the underfur and the total impression of the fur quality are given, the right-hand number disclosing the better quality.

It is clear from the table that the hemoglobin values for mink fed with raw, cleaned coalfish without addition to basic diet of food additives according to the invention, are as far down as 14,8 – 15,5. Addition to the basic diet of ferrosulphate or ferrihydroxide has no sure, advantageous effect on this form of anemia either, whilst the addition of amino acid in the form of an iron complex or special ferri glutamate, or addition of lactic acid or ferri-desoxyribonucleate, prevents this special form of anemia, the colour of the underfur and the total impression of the fur quality being, at the same time, much higher.

TABLE

| Number of experimental years | Basic diet | Addition to basic diet | Average values at the time of skinning | | |
|---|---|---|---|---|---|
| | | | Hemoglobin value | Colour in underfur | Total impression of the fur quality |
| 2 years | Raw cleaned coalfish | Ferridi-glutamate readily soluble | 18,1 | 5,05 | 5,35 |
| 3 years | Raw cleaned coalfish | Ferridi-glutamate powder not so readily soluble | 17,0 | 4,86 | 5,23 |
| 2 years | Raw cleaned coalfish | Ferridi-glutamate readily soluble +HCl or lactic acid or sour milk | 18,4 | 5,05 | 5,4 |
| 1 year | Raw cleaned coalfish | Lactic acid | 17,4 | 4,6 | 5,1 |
| 1 year | Raw cleaned coalfish | Ferridesoxy-ribonucleate | 17,1 | 5,1 | 5,1 |
| 3 years | Raw cleaned coalfish | Ferro-sulphate | 14,9 | 4,0 | 4,6 |
| 1 year | Raw cleaned coalfish | Ferri-hydroxide | 13,6 | 3,0 | 3,9 |
| 3 years | Raw cleaned coalfish | | 14,8 | 3,4 | 3,9 |
| 1 year | Raw cleaned coalfish | | 15,5 | 4,1 | 4,4 | slightly soluble in acid environment but readily soluble in alkaline solvent.

The protective feed should not contain rancid fat or large amounts of unsaturated marine fat which readily becomes rancid in a dry protective food. The protective food must contain optimal amounts of all vitamins including linoleic and linolenic acid, in addition to mineral substances and the balanced ratio of proteins, saturated fat and carbon hydrates, suitable for fur-bearing animals.

Coalfish is particularly mentioned as raw fish hereinbelow, however, it is obvious that any marine fish type can be used in raw, cleaned state as basis for the fur-bearing animal diet.

The results of some feeding experiments are set forth hereinbelow in a table, where, as basic feed, raw, cleaned coalfish was used with various additions to the basic diet, and average values of hemoglobin value, col- Having described my invention, I claim:

1. An improved diet for fur-bearing animals, particularly mink, comprising raw marine fish and an iron containing additive, wherein the improvement comprises employing as the iron-containing additive ferric iron chelated with an organic acid selected from glutamic acid and ribonucleic acid.

2. Diet according to claim 1 including an ingredient selected from the group consisting of HCl, lactic acid and sour milk.

3. An improved method of feeding mink with raw marine fish and an iron containing additive, wherein the improvement comprises employing as the iron-containing additive ferric iron chelated with an organic acid selected from glutamic acid and ribonucleic acid.

4. Method according to claim 3 in which an ingredient selected from the group consisting of HCl, lactic acid and sour milk is included.

* * * * *